April 21, 1925.  1,534,190

G. P. SIMPSON

OVEN

Filed July 13, 1921

Inventor
George P. Simpson
Seymour Earle
attys

Patented Apr. 21, 1925.

1,534,190

UNITED STATES PATENT OFFICE.

GEORGE P. SIMPSON, OF NEW HAVEN, CONNECTICUT, ASSIGNOR TO THE OVEN EQUIPMENT & MFG. CO., OF NEW HAVEN, CONNECTICUT, A CORPORATION.

OVEN.

Application filed July 13, 1921. Serial No. 484,312.

*To all whom it may concern:*

Be it known that I, GEORGE P. SIMPSON, a subject of the King of Great Britain, and residing at New Haven, in the county of New Haven and State of Connecticut, have invented a new and useful Improvement in Ovens; and I do hereby declare the following, when taken in connection with the accompanying drawings, and the characters of reference marked thereon, to be a full, clear, and exact description of the same, and which said drawings constitute part of this application, and represent, in—

Figure 1:
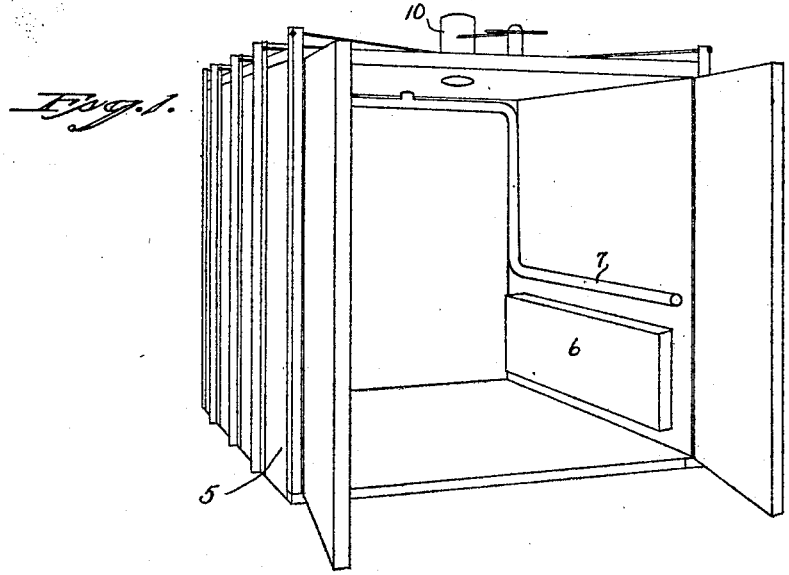

Fig. 1 a perspective view of an oven illustrating my invention.

Figure 2:
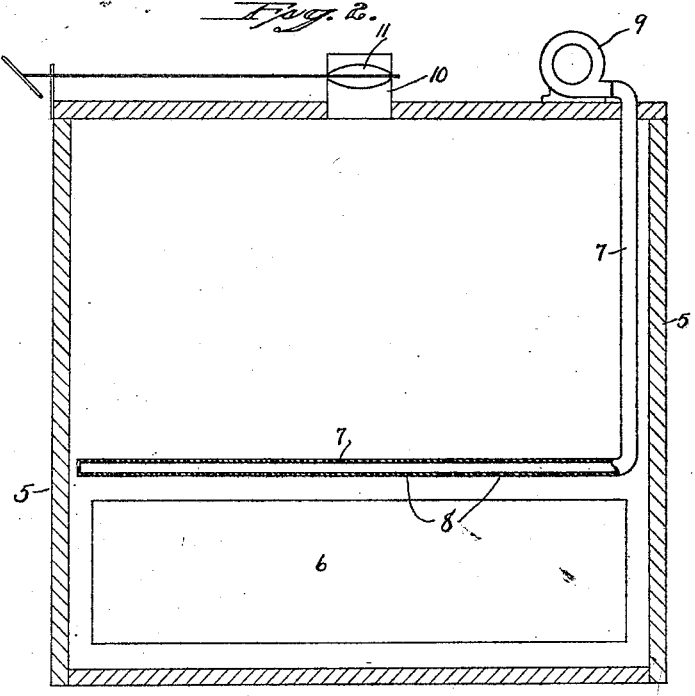

Fig. 2 a vertical sectional view of the same.

Figure 3:
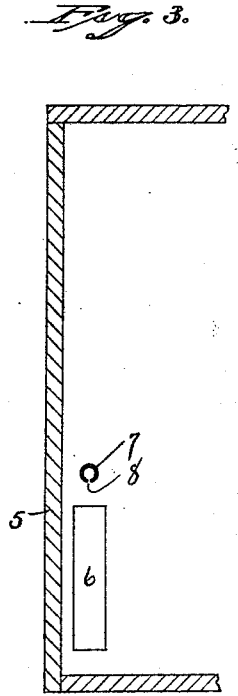

Fig. 3 a broken sectional view of the same.

Figures 2 and 3 are diagrammatic in nature.

This invention relates to an improvement in ovens, and particularly to ovens for drying, japanning, etc. In the more general construction of ovens, the heating-unit is arranged near the bottom and heat therefrom rises to the top and hence the temperature varies in different parts of the oven.

The object of this invention is to provide a circulating medium, whereby the air rising from the heating-unit will be evenly distributed throughout the oven, and the invention consists in the method and construction as hereinafter described and particularly recited in the claims.

In carrying out my invention, I employ an oven 5 of any approved construction, which will vary according to the uses for which the oven is designed. As is usual, this oven will be heated by a heating-unit 6, which may be electric coils or steam coils, but, in either case, the heating-unit is preferably arranged at one side and near the bottom of the oven for radiation directly into the oven. Above the heating-unit and in close relation thereto is a pipe 7 having, in its under side, a series of perforations 8 directed downward toward the heating-unit 6. This pipe 7 leads from a blower 9, or other source of air supply, whereby air may be forced into the oven and directed in jets downward against currents of air rising from the heating-unit.

As herein shown, the oven is provided at the top with an outlet 10 controlled by a damper 11 and with such other accessories as may be required for the purpose for which the oven is to be used.

The downwardly-projecting jets of air against the upward currents of heat from the heating-unit so changes the currents that a complete circulation is maintained within the oven, whereby the temperature is equalized throughout the oven and overheating at the top, with a much lower temperature at the bottom, is avoided.

I claim:

1. The combination with an oven having a baking-chamber, of a heating-unit located in the lower part of the said chamber, so as to radiate heat directly thereinto, and means located directly over the said unit in close proximity thereto and adapted to force jets of air downward against the currents of heated air rising therefrom, so as to deflect the same downward toward the bottom of the chamber, whereby the heat radiated from the heating-unit is prevented from rising to the top of the chamber until it has first diffused itself throughout the lower portion thereof.

2. The combination with an oven having a baking-chamber, of an unhoused heating-unit located in the lower portion of the chamber adjacent to one of the side walls thereof and radiating directly into the chamber, and an air-pipe located directly over the said heating-unit and provided in its lower face with perforations, whereby the air rising from the unit is met by jets of air from the said pipe, causing it to be deflected into the bottom of the chamber, preparatory to being diffused throughout the same.

In testimony whereof, I have signed this specification in the presence of two subscribing witnesses.

GEORGE P. SIMPSON.

Witnesses:
 FREDERIC C. EARLE,
 MALCOLM P. NICHOLS.